United States Patent
Kawae et al.

Patent Number: 5,989,319
Date of Patent: Nov. 23, 1999

[54] GAS SEPARATOR

[75] Inventors: Takayuki Kawae; Shinichi Kosaka, both of Nagoya; Shinji Nakamura, Kasugai, all of Japan

[73] Assignee: NGK Insulators, Ltd., Nagoya, Japan

[21] Appl. No.: 08/888,097

[22] Filed: Jul. 3, 1997

[30] Foreign Application Priority Data

| Jul. 8, 1996 | [JP] | Japan | 8-178326 |
| Jun. 24, 1997 | [JP] | Japan | 9-167669 |

[51] Int. Cl.⁶ .......................... B01D 69/10; B01D 71/02
[52] U.S. Cl. .......................... 96/11; 95/56; 96/10; 55/524
[58] Field of Search .................. 95/55, 56; 96/4, 96/10, 11; 55/524

[56] References Cited

U.S. PATENT DOCUMENTS

| 2,609,059 | 9/1952 | Benedict | 95/55 |
| 2,824,620 | 2/1958 | de Rosset | 95/56 |
| 2,958,391 | 11/1960 | de Rosset | 96/11 X |
| 3,022,187 | 2/1962 | Eyraud et al. | 96/11 X |
| 3,344,582 | 10/1967 | Merrill et al. | 95/56 |
| 3,350,846 | 11/1967 | Makrides et al. | 95/56 |
| 3,359,705 | 12/1967 | Mullhaupt | 55/16 |
| 3,413,777 | 12/1968 | Langley et al. | 96/11 |
| 3,428,476 | 2/1969 | Langley et al. | 96/11 X |
| 4,230,463 | 10/1980 | Henis et al. | 95/55 X |
| 4,689,150 | 8/1987 | Abe et al. | 96/11 X |
| 4,865,630 | 9/1989 | Abe | 96/11 |
| 4,902,307 | 2/1990 | Gavalas et al. | 95/55 |
| 4,971,696 | 11/1990 | Abe et al. | 96/11 X |
| 4,981,676 | 1/1991 | Minet et al. | 95/55 X |
| 5,007,944 | 4/1991 | Pinnau et al. | 95/55 X |
| 5,205,841 | 4/1993 | Vaiman | 95/56 X |
| 5,306,476 | 4/1994 | Jalan et al. | 96/11 X |
| 5,342,431 | 8/1994 | Anderson et al. | 96/10 X |
| 5,518,530 | 5/1996 | Sakai et al. | 95/56 X |
| 5,614,001 | 3/1997 | Kosaka et al. | 95/55 X |

FOREIGN PATENT DOCUMENTS

| 0 715 880 A1 | 6/1996 | European Pat. Off. . | |
| 53-043153 | 11/1978 | Japan | 95/56 |
| 62-121616 | 6/1987 | Japan | 96/11 |
| 62-273029 | 11/1987 | Japan | 96/11 |
| 62-273030 | 11/1987 | Japan . | |
| 63-294925 | 12/1988 | Japan | 96/11 |
| 3-52630 | 3/1991 | Japan . | |
| 3-146122 | 6/1991 | Japan . | |
| 3-288534 | 12/1991 | Japan . | |
| 5-137979 | 6/1993 | Japan . | |
| 5-53527 | 8/1993 | Japan . | |
| 6-114230 | 4/1994 | Japan | 96/11 |
| WO 96/00608 | 1/1996 | WIPO . | |

OTHER PUBLICATIONS

J. Shu et al., "Simultaneous deposition of Pd and Ag on porous stainless steel by electroless planting", Journal of Membrane Science, vol. 77, Nos. 2/3, pp. 181–195, (Mar. 4, 1993).

J. Shu et al., "Morphological study of hydrogen permeable Pd membranes", Thin Solid Films, vol. 252, No. 1, pp. 26–31, (Nov. 15, 1994).

J. Collins et al., "Preparation and Characterization of a Composite Palladium–Ceramic Membrane", Industrial & Engineering Chemistry Research, vol. 32, pp. 3006–3013, (1993).

*Primary Examiner*—Robert H. Spitzer
*Attorney, Agent, or Firm*—Kubovcik & Kubovcik

[57] ABSTRACT

A gas separator includes a porous substrate having fine pores opened on its surface and a metal for separating a gas, the porous substrate having fine pores having an average diameter of 0.4–0.9 μm, and the metal for separating a gas being filled into the pores in the porous substrate to close them. A gas separation film seldom exfoliate from the porous substrate, and the gas separator is excellent in durability in comparison with a conventional gas separator.

5 Claims, 2 Drawing Sheets

GAS SEPARATOR

BACKGROUND OF THE INVENTION AND RELATED ARE STATEMENT

The present invention relates to a gas separator for separating a specific gas from a mixed gas by diffusion.

Heretofore, as a technique for obtaining a specific gas from a mixed gas, there is known a separation method by the use of an organic or an inorganic gas separating film. Among the separating films, examples of a hydrogen separating film for use in a film separation method include organic polymeric films of polyimide, polysulfone and the like, and inorganic compound films of palladium, palladium alloys and the like, and examples of an oxygen separating film include films of silver and silver alloys. The palladium film and the palladium alloy films have heat resistance and can obtain extremely high-purity hydrogen.

Palladium and the palladium alloys have characteristics which allow hydrogen to be dissolved therein and which allow hydrogen to permeate therethrough, and by the utilization of the characteristics, a thin film comprising palladium or the palladium alloy has been widely used as a gas separator for separating hydrogen from a mixed gas containing hydrogen. However, the thin film comprising palladium itself is weak in mechanical strength, and so, in Japanese Patent Application Laid-open No. 62-273030, palladium or the palladium alloy is deposited on the surface of an inorganic porous support of a porous glass, porous ceramics, a porous aluminum oxide or the like to increase the mechanical strength of the thin film comprising palladium or the palladium alloy.

Japanese Patent Application Laid-open No. 3-146122 discloses a method for preparing a hydrogen separator which comprises first forming a palladium thin film on the surface of a heat-resistant porous substrate by a chemical plating process, and further forming a silver thin film on the palladium thin film by the chemical plating process, followed by a heat treatment. According to this disclosed method, a hydrogen separator having the porous substrate and a palladium alloy thin film covering it can be obtained. In this palladium alloy thin film, palladium and silver are uniformly distributed by the above-mentioned heat treatment.

In addition, U.S. Pat. No. 3,359,705 discloses a silver thin film for separating oxygen.

However, these gas separators have a drawback that a material gas to be subjected to the gas separation leaks into a purified gas through holes (hereinafter referred to as "throughhole-defects") which extend through the gas separating film comprising the metal for separating the gas. Therefore, the concentration of hydrogen in the purified gas deteriorates as much as the leaked material gas.

In order to remove these throughhole-defects, there is a method of thickening the gas separating film comprised of the metal for separating the gas, but this method has a problem that a gas permeability of the gas separating film deteriorates and hence a gas separation efficiency also deteriorates. However, this method prevents a material gas from getting mixed in a refined gas, and therefore, a hydrogen gas with high purity can be obtained.

Further, Japanese Patent Application Laid-Open No. 6-277472 discloses that pores are closed by filling a metal having a gas separating ability inside the pores opened on the surface of a porous substrate. According to this method, a leakage of a material gas into a refined gas can be avoided without deteriorating an efficiency of separating a gas.

However, when a thickness of a gas separating film is made thick, the method has a problem that adhesive properties between the gas separating film and a substrate such as a porous film are weak, and when the hydrogen separator obtained by the method is actually used in a gas separation process, the gas separating film peels in a short period of time. In consequence, such a hydrogen separator cannot be used continuously for a long term in order to carry out the gas separation.

When a hydrogen separating film disclosed in Japanese Patent Application Laid-Open No. 6-277472 is used, it is desired that a frequency of an exfoliation is decreased though a continuous gas separation for a long term in comparison with a separator having a thickened gas separation film.

The present invention is made in light of the background of the problems of the above-mentioned conventional techniques, and an object of the present invention is to provide a gas separator which can prevent a material gas to be subjected to a gas separation from leaking into a purified gas and which hardly has an exfoliation of a gas separating film and which has excellent durability in comparison with a conventional gas separator.

SUMMARY OF THE INVENTION

According to the present invention, there is provided a gas separator comprising a porous substrate having pores opened on its surface and a metal for separating a gas, the porous substrate having pores having an average diameter of 0.4–0.9 μm, and the metal for separating a gas being filled into the pores in the porous substrate to close them.

In the present invention, the metal for separating the gas preferably covers at least a portion of the surface of the porous substrate to form a thin film thereon.

The porous substrate preferably comprises particles each having a diameter being 1.5–6.0 times larger than the average diameter of fine pores.

The metal for separating the gas preferably covers at least a portion of the surface of the porous substrate to form a thin film thereon.

Further, in the present invention, a depth of the metal for separating the gas which penetrates into the porous substrate is preferably in the range of 1 to 30 μm from the surface of the porous substrate.

Furthermore, in the present invention, the metal for separating the gas is preferably palladium, an alloy mainly composing palladium, or an alloy containing palladium.

DETAILED DESCRIPTION OF THE INVENTION

Figure 1:
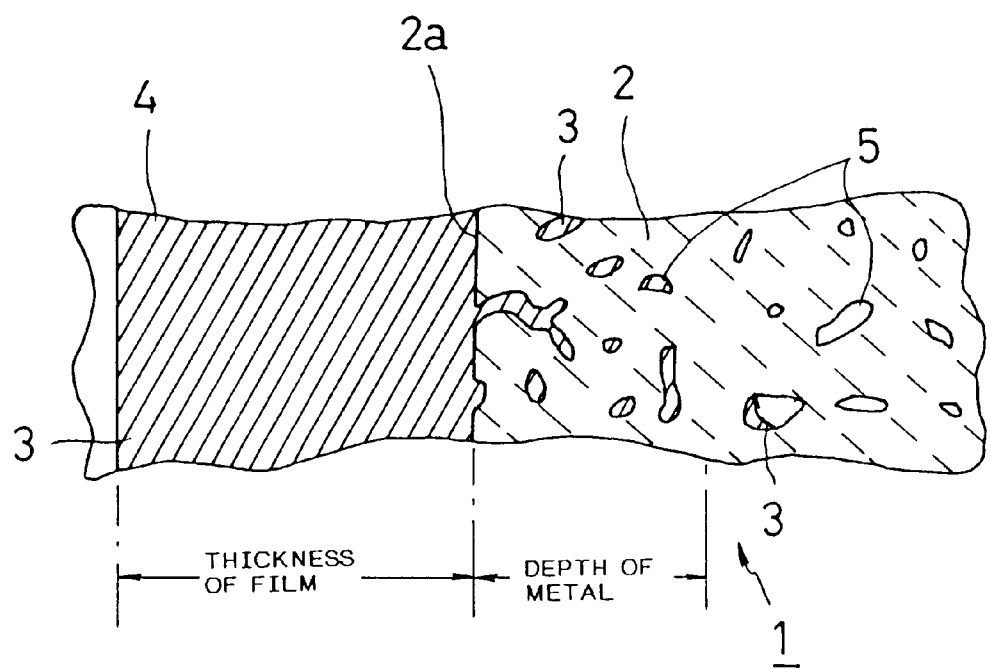
FIG. 1 is an illustrative view showing a section of a gas separator of the present invention.

A gas separator 1 of the present invention has a porous substrate 2 and a metal 3 for separating a gas. The porous substrate 2 is porous, and so it has many pores 5, and some of the pores extend to the surface of the porous substrate 2 and they are opened thereon. In the present invention, the metal 3 for separating the gas is filled into the pores 5 opened on a porous substrate surface 2a to close them. In consequence, when a material gas to be subjected to a gas separation by the gas separator 1 is passed through the pores 5 in the porous substrate 2, a specific gas permeates the metal 3 for separating the gas, thereby separating the specific gas from the material gas. Furthermore, in the gas separator 1 of the present invention, the metal 3 for separating the gas is filled into the pores 5 to close them, so that the material gas is prevented from leaking into a purified gas. Therefore, for example, in the case of the gas separator of the present invention in which a palladium alloy is used, a hydrogen gas having a purity of 99% or more can be obtained, and usually, the hydrogen gas having a purity of 99.9% or more can be obtained.

As the porous substrate 2, a material which does not react with the material gas is preferable. Typical examples of the porous substrate 2 include alumina, silica, silica-alumina, mullite, cordierite, zirconia, carbon, and porous glasses.

This porous substrate has many three-dimensionally connected fine pores. It is important that the average diameter of these pores is in the range of 0.4 to 0.9 μm. If the pore diameter is less than 0.4 μm, an anchor effect between the substrate and the plated film is small, and therefore, a film is exfoliated from a substrate after being used for a long period because of a difference in expansion between the substrate and the film caused by a temperature change or because of expansion and shrinkage of the film caused by occlusion and release of a gas.

If the average diameter of the pores exceeds 0.9 μm, airtightness of the pores cannot be ensured because the pores cannot be closed by a chemical plating, and therefore, a gas having an aimed purity cannot be obtained. That is, in the present invention, since an average diameter of the pores in the porous substrate is specified to the aforementioned size, a gas separating film is hardly exfoliated. Such a porous substrate can be obtained, for example, by a process described in Japanese Patent Application Laid-open No. 62-273030.

The diameter of the pores in the porous substrate is preferably uniformalized, because the uniform diameter permits easy regulation of the depth of a solution which penetrates into the porous substrate in the activation step or the chemical plating step, and thus permits easily and uniformly maintaining the depth of the metal for separating the gas which penetrates in the porous substrate. No particular restriction is put on the thickness of the porous substrate 2, so long as the porous substrate 2 can hold a sufficient mechanical strength in a use environment.

Moreover, the porous substrate 2 preferably has a planar shape, and the planar shape include a plane shape and a curved shape. In addition, it naturally includes a tubular shape which corresponds to a closed curved shape. In the case of the tubular shape, the shape of its section is optional, but the tubular substrate having a circular section is easily available and preferable. Furthermore, the gas separator or the porous substrate 2 may have a plate shape. In this case, it can take an optional shape in compliance with its use purpose.

The porous substrate 2 has a porosity of preferably 25–45%, and more preferably 28–35%. When the porosity is lower than 25%, a gas diffusibility of the porous substrate 2 is bad. When the porosity is higher than 45%, a-mechanical strength is deteriorated.

Each of the particles constituting the porous substrate 2 preferably has a diameter of 1.5–6.0 times, more preferably 2.0–4.0 times, larger than an average diameter of the pores in the porous substrate 2. When the particle diameter is smaller than 1.5 times, a packing rate increases, and a porosity decreases. When the particle diameter is larger than 6.0 times, a porosity increases.

The kind of metal 3 for separating the gas depends upon the kind of gas to be purified. For example, in order to purify a hydrogen gas, palladium, an alloy mainly comprising palladium or an alloy containing palladium is selected. For the sake of the separation of oxygen, a thin film of silver or an alloy mainly comprising silver, or a thin film of an organic material is used.

In the present invention, as shown in FIG. 1, the metal 3 for separating this gas is filled into the pores 5 opened on the surface 2a of the porous substrate 2 to close these pores 5. In FIG. 1, the metal 3 covers the surface 2a of the porous substrate 2 to form the gas separating film 4. However, in the gas separator 1 of the present invention, the metal 3 for separating the gas present in the porous substrate 2 functions to separate the gas, and hence such a gas separating film 4 as shown FIG. 1 is not essential.

However, it is preferable that the metal 3 for separating the gas covers at least a part of the surface 2a of the porous substrate 2 to form the gas separating film 4 thereon, because the permeation of the gas to be purified through the metal 3 for separating the gas can be more assured. In this case, the metal 3 may cover a part alone of the porous substrate surface 2a, whereby in the covered part, the permeation of the gas to be purified through the metal 3 for separating the gas can be more assured.

The gas separating film 4 preferably covers the porous substrate surface 2a. The metal 3 for separating the gas, which is filled into the pores opened on the surface of the porous substrate to close these pores, is preferably continuously connected with the metal for separating the gas which constitutes the gas separating film 4, as shown in FIG. 1, whereby adhesion between the gas separating film 4 and the porous substrate can be improved and the peeling of the gas separating film 4 from the porous substrate surface 2 a can be sufficiently prevented.

The thickness of the gas separating film 4 is preferably 50 μm or less, more preferably 20 μm or less. If the thickness of the gas separating film 4 is in excess of 50 μm, a long time is taken for the material gas to diffuse in the gas separating film at the time of gas separation by the gas separator, so that a treatment time is prolonged inconveniently.

The depth of the metal 3 for separating the gas which penetrates into the porous substrate 2 is preferably in the range of 1 to 30 μm, more preferably 1 to 20 μm, most preferably 1 to 10 μm from the surface of the porous substrate. If this depth is less than 1 μm, the closure of the pores with the metal 3 for separating the gas is not sufficient, and the material gas may leak into the purified gas. In addition, when the gas separating film 4 is formed, this gas separating film 4 is liable to peel from the porous substrate surface 2a. On the other hand, if this depth is more than 30 μm, a long time is taken for the gas to be separated to diffuse in the metal 3 for separating the gas at the time of gas separation by the gas separator 1, so that a gas separation time is prolonged inconveniently.

In the case that the porous substrate 2 has a tubular shape, the surface 2a of the porous substrate having the pores into which the metal 3 for separating the gas is filled may be present on an outer side or an inner side of the tubular porous substrate.

In the case that the metal 3 for separating the gas comprises a palladium alloy, the content of metals other than palladium is preferably in the range of 10 to 30% by weight, as described in "Hydrogen Permeable Palladium-Silver Alloy Membrane Supported on Porous Ceramics", Journal of Membrane Science, Vol. 56, p. 315–325 (1991) and Japanese Patent Application Laid-open No. 63-29540. The main purpose of using palladium in the form of the alloy is to prevent the embrittlement of palladium with hydrogen and to improve a separation efficiency at a high temperature. It is preferable for the prevention of the embrittlement of palladium with hydrogen to contain silver as a metal other than palladium.

A gas separator of the present invention is produced by a method including, for example, the following activation step and chemical plating step.

In the activation step, one surface of the porous substrate is immersed in a solution containing an activated metal so that the pressure applied to the one surface may be higher than the pressure applied to the other opposite surface of the porous substrate, whereby the solution is allowed to penetrate into the pores opened on the one surface of the porous substrate to which the higher pressure is applied. Owing to the presence of such a pressure difference, the activated metal can be deposited not only on the surface of the porous substrate but also on the inner surfaces of the pores opened on the surface of the porous substrate. On the surface on which the activated metal has been deposited, a metal for separating the gas will be further deposited by the next chemical plating step.

In this activation step, the one surface of the porous substrate onto which the higher pressure is applied is required to be immersed in the solution, but the other opposite surface does not have to be immersed in the solution. For example, in the case that the tubular porous substrate is used, its outer surface may be immersed in the solution containing the activated metal, and the inside portion of the tube can be sucked by a vacuum pump. Alternatively, the outer surface of the tubular porous substrate may be immersed in the solution containing the activated metal, and the pressure may be applied to this solution to maintain the inside portion of the tube at a constant pressure. In either case, the outer surface and the inner surface of the tube can be inverted, and the inner surface of the tube is immersed in the solution and the pressure can be changed.

As the activated metal, a compound containing divalent palladium ions can be suitably used. Concretely, the activation step can be achieved by alternately immersing the porous substrate in an aqueous hydrochloric acid solution of palladium chloride and an aqueous hydrochloric acid solution of tin chloride, and while the immersion is done in either solution, the predetermined pressure difference is preferably maintained.

In the next chemical plating step, electroless plating is carried out by the use of at least the metal for separating the gas and a plating solution containing a reducing agent to deposit the metal for separating the gas in the pores of the porous substrate, whereby the metal for separating the gas is filled into the pores to close them.

In this chemical plating step, the one surface of the porous substrate already treated in the above-mentioned activation step is treated. For example, the chemical plating step can be achieved by replacing the above-mentioned solution used in the activation step with the suitable plating solution.

Also in this chemical plating step, it is preferable that one surface of the porous substrate is immersed in the plating solution containing at least the metal for separating the gas and the reducing agent so that the pressure applied to the one surface may be higher than the pressure applied to the other opposite surface of the porous substrate, in the same manner as in the above-mentioned activation step. This pressure difference makes it easy for the plating solution to permeate into the pores opened on the surface of the porous substrate. As described above, the portion on which the activated metal has been deposited in the activation step is plated in this chemical plating step.

The depth of the penetrated metal for separating the gas from the surface of the porous substrate can be adjusted by controlling an immersion time in the chemical plating step, a temperature of the plating solution, a difference between the pressures applied to both the surfaces of the porous substrate, and the like.

For the sake of the hydrogen separation, a known chemical plating solution containing palladium is used, and for the oxygen separation, a known chemical plating solution containing, for example, silver nitrate, EDTA, aqueous ammonia and hydrazine is used.

In the case that the gas separator for separating hydrogen is prepared, it is preferable that after the chemical plating of palladium, silver is further chemically plated on the palladium-deposited surface, followed by a heat treatment, to mutually diffuse palladium and silver and to thereby form an alloy of palladium and silver.

Now, the present invention will be described in detail with reference to examples.

Examples 1–3

In the first place, a porous substrate was subjected to an activation treatment. A porous α-alumina cylindrical tube having an outer diameter of 10 mm, an inner diameter of 7 mm, a length of 1000 mm and a fine pore diameter of 0.4 $\mu$m, 0.5 $\mu$m, and 0.9 $\mu$m were used in Examples 1, 2 and 3, respectively. The outer surface of this alumina tube was immersed for 1 minute in a 0.1% aqueous hydrochloric acid solution containing 0.1% by weight of $SnCl_2 \cdot 2H_2O$. A pressure inside was kept reduced, and the outer surface of this tube was immersed for 1 minute in a 0.1% aqueous hydrochloric acid solution containing 0.01% by weight of $PdCl_2$. This immersion treatment was repeated 10 times in each of both the aqueous hydrochloric acid solutions.

Next, palladium was chemically plated. $[Pd(NH_3)_4]Cl_2 \cdot H_2O$ (5.4 g), 2Na•EDTA (67.2 g), aqueous ammonia having an ammonia concentration of 28% (651.3 ml) and $H_2NNH_2 \cdot H_2O$ (0.46 ml) were added to 1 liter of deionized water to prepare an aqueous solution, and the outer surface of the porous alumina tube which had been subjected to the above-mentioned activation treatment was immersed in this aqueous solution whose temperature was controlled to 50° C. This immersion time was changed to adjust a thickness of a thin film covered on the surface of the porous substrate and a depth of the solution which penetrated into the porous substrate.

Next, silver was chemically plated. $AgNO_3$ (3.46 g), 2Na•EDTA (33.6 g), aqueous ammonia having an ammonia concentration of 28% (651.3 ml) and $H_2NNH_2 \cdot H_2O$ (0.46 ml) were added to 1 liter of deionized water to prepare an aqueous solution, and the outer surface of the porous alumina tube which had been subjected to the above-mentioned activation treatment was immersed in this aqueous solution whose temperature was controlled to 50° C. This immersion time was changed as shown in Table 1, and silver was then chemically plated so that a weight ratio of palladium:silver might be 80:20.

In the last place, the thus treated porous alumina tube was maintained at 900° C. for 12 hours to carry out a heat treatment, whereby palladium and silver were mutually diffused, and an alloy of palladium and silver was formed to obtain a gas separator.

For the thus obtained gas separator, an airtight test was carried out. An argon gas was introduced into an outer peripheral portion of the gas separator, and a pressure of 9 kg weight/cm$^2$ was maintained. At this time, an amount of the gas leaked into the gas separator was measured.

Figure 2:
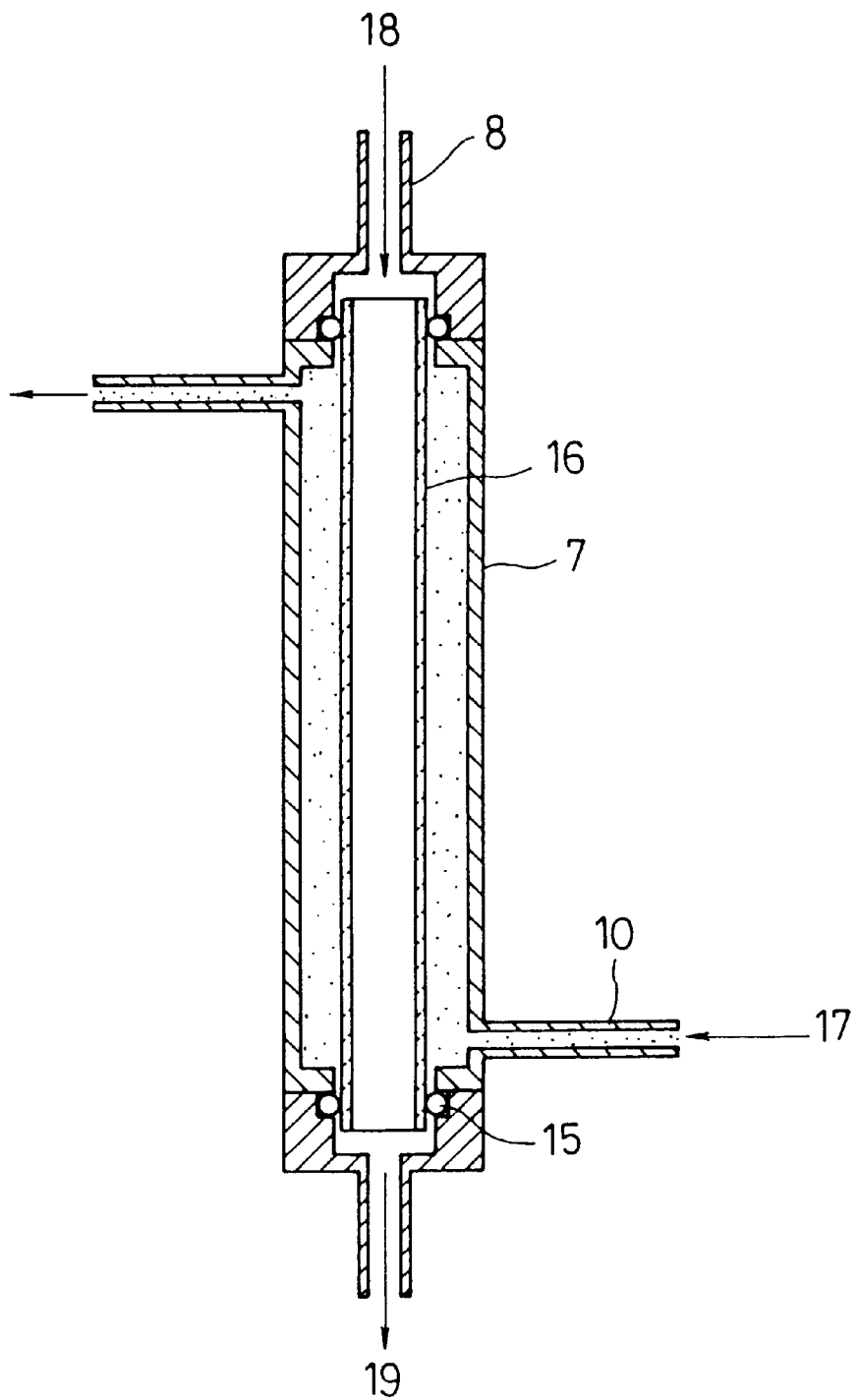
FIG. 2 is an illustrative view for the description of a gas purification method using the gas separator of the present invention.

Furthermore, for the gas separator, a hydrogen separation test was carried out. A mixed gas comprising 75% by volume of hydrogen and 25% by volume of carbon dioxide was used as a material gas. A schematic view of a test device is shown in FIG. 2. In the device shown in FIG. 2, gas separator 16 is sealed in a chamber 7 by O-rings 15. First, a chamber 7 was heated up to 500° C. Next, the above-mentioned mixed gas 17 having a pressure of 9 kg weight/cm$^2$ was introduced into the outer peripheral portion of a gas separator 16 through inlet tube 10 at 2 N liter (i.e., a volume at room temperature was 2 liters) per minute. Argon having a pressure of 1 kg weight/cm$^2$ was introduced as a sweep gas 18 into the gas separator 16 through inlet tube 8 at 0.1 N liter per minute. A purified gas 19 thus obtained was quantitatively analyzed by a gas chromatography to inspect a gas permeation rate of the purified gas and a hydrogen concentration in the purified gas.

For example, in Example 1, a gas permeation rate per minute in 1 cm$^2$ of the palladium film of the gas separator was 55 ml, and a hydrogen purity of a purified gas 19 was 99.9% or more.

Then, the film of the gas separator was measured for an adhesion strength with the porous substrate. A metallic material having dimensions of 4 mm×4 mm was fixed to a film. The metallic material was pulled perpendicularly to the film. A strength when the metallic material is exfoliated was defined as an adhesion strength.

The gas separator was subjected to an evaluation cycle test and a serial evaluation test so as to examine durability of the gas separator. In the evaluation cycle test was repeated a cycle of heating the gas separator from room temperature to 500° C. in Ar gas, exposing it to a mixed gas at 500° C., and cooling it to the room temperature in Ar gas. The number of steps required for deterioration of airtightness of the gas separator was measured. The serial evaluation test was carried out by exposing the gas separator to a mixed gas at 500° C., and a time required for a deterioration of airtightness of the gas separator was measured.

The results of these tests are shown in Table 1.

TABLE 1

| | Gas separator | | | | | |
|---|---|---|---|---|---|---|
| | Average pore diameter of porous substrate (μm) | Thickness of film (μm) | Depth (μm) | Particle diameter (μm) | Porosity (%) | Airtight test Leaked gas (ml/(min · cm$^2$)) |
| Example 1 | 0.4 | 20 | 3 | 1.0 | 25 | 0 |
| Example 2 | 0.5 | 20 | 7 | 1.8 | 30 | 0 |
| Example 3 | 0.9 | 20 | 10 | 3.5 | 33 | 0 |
| Comparative Example 1 | 0.01 | 20 | ≦0.1 | 0.05 | 20 | 0 |
| Comparative Example 2 | 0.05 | 20 | ≦0.1 | 0.2 | 28 | 5 |
| Comparative Example 3 | 0.2 | 20 | 1 | 0.5 | 30 | 0 |
| Comparative Example 4 | 1.5 | 20 | 15 | 4.4 | 37 | 0 |
| Comparative Example 5 | 10 | 20 | 30< | 20.0 | 45 | 10 |

| | Gas separation test | | Adhesion strength | Durability | |
|---|---|---|---|---|---|
| | Refined gas (ml/(min · cm$^2$)) | Purity of hydrogen (%) | between film and porous substrate (kg/cm$^2$) | Evaluation cycle test (cycles) | Serial Evaluation Test (hours) |
| Example 1 | 55 | 99.9≦ | 80 | 300≦ | 8000≦ |
| Example 2 | 58 | 99.9≦ | 94 | 300≦ | 8000≦ |
| Example 3 | 43 | 99.9≦ | 140 | 300≦ | 8000≦ |
| Comparative Example 1 | 40 | 99.9≦ | 3 | 20 | 600 |
| Comparative Example 2 | 61 | 86 | 6 | 30 | 2000 |
| Comparative Example 3 | 55 | 99.9≦ | 19 | 150 | 6000 |
| Comparative Example 4 | 40 | 99.9≦ | 160 | 250 | 6100 |
| Comparative Example 5 | 72 | 73 | 250 | 20 | 700 |

Comparative Examples 1–5

Gas separators were subjected to a treatment under the same conditions as in the above examples except that a porous substrate having an average pore diameter of 0.01 μm, 0.05 μm, 0.2 μm, 1.5 μm and 10 μm were used in Comparative Examples 1–5, respectively, and that a thin film penetrating into the porous substrate has a depth of 0.1 μm or less, 0.1 μm or less, 1 μm, 15 μm, and more than 30 μm in Comparative Examples 1–5, respectively. The results are shown in Table 1.

Each of the gas separators in the Examples had a sufficient adhesion strength between a film and a porous substrate and an excellent durability of 300 cycles or more of an evaluation cycle test and 8000 hours or more of a serial evaluation test. Further, a refined hydrogen gas had a purity of 99.9% or more in a hydrogen separation test.

On the other hand, each of hydrogen separators in Comparative Examples 1 and 2 had an exfoliation of a hydrogen separation film in an evaluation cycle test and a serial evaluation test. A gas separator in Comparative Example 2 had a leakage of a refined gas into a material gas in test, and the refined hydrogen gas had a low purity of 86%.

In hydrogen separators of Comparative Examples 3 and 4, airtightness was deteriorated after 150 cycles and 250 cycles, respectively, in an evaluation cycle test. It was because that an adhesion strength between the film and the porous substrate was insufficient in Comparative Example 3, and blockade of pores by a hydrogen separation film was insufficient in Comparative Example 4.

Further, in the hydrogen separator of Comparative Example 5, blockage of pores by a hydrogen separation film was insufficient, and durability was deteriorated in an evaluation cycle test and a serial evaluation test. Simultaneously, a refined gas leaked into a material gas in a hydrogen separation test, and the refined hydrogen gas had a low purity of 73%.

Incidentally, in the aforementioned Examples and Comparative Examples, test pieces were produced with the same material and in the same condition as a porous substrate. An average pore diameter and porosity of the porous substrate was measured by a mercury porosimeter and an Archimedes method.

In the gas separator of the present invention, the metal for separating the gas is filled into the pores opened on the surface of the porous substrate to close them, whereby the material gas to be subjected to the gas separation by the gas separator can be prevented from leaking into the purified gas and is free from deterioration of gas separation efficiency. For example, according to the gas separator of the present invention using a palladium alloy, a hydrogen gas having a purity of 99.9% or more can be obtained.

Further, since an average diameter of pores of a porous substrate is specified to a predetermined value, a gas separation film seldom exfoliates from the porous substrate, and therefore a gas separator of the present invention is excellent in durability in comparison with a conventional gas separator.

What is claimed is:

1. A gas separator comprising a porous ceramic substrate having fine pores opened on its surface and a metal for separating a gas, wherein said fine pores have an average diameter of 0.4–0.9 $\mu$m, and the metal for separating a gas is filled into the pores in the porous ceramic substrate to close them.

2. The gas separator according to claim 1, wherein the porous ceramic substrate comprises particles each having a diameter 1.5–6.0 times larger than the average diameter of said fine pores.

3. The gas separator according to claim 1, wherein the metal for separating the gas covers at least a portion of the surface of the porous ceramic substrate to form a thin film thereon.

4. The gas separator according to claim 1, wherein a depth of the metal for separating the gas which penetrates into the porous ceramic substrate is in the range of 1 to 30 $\mu$m from the surface of the porous ceramic substrate.

5. The gas separating according to claim 1, wherein the metal for separating the gas is palladium, an alloy mainly composing palladium, or an alloy containing palladium.

* * * * *